United States Patent

[11] 3,542,162

[72] Inventors Richard H. Kerr
 West Milton;
 Don D. Durnell, Springfield, Ohio
[21] Appl. No. 775,034
[22] Filed Nov. 12, 1968
[45] Patented Nov. 24, 1970
[73] Assignee Kelsey-Hayes Company
 Springfield, Ohio
 a corporation of Delaware

[54] TORQUE LIMITING DEVICE
 6 Claims, 6 Drawing Figs.
[52] U.S. Cl. .................................................. 188/134,
 192/7
[51] Int. Cl. .................................................. B60t 7/12
[50] Field of Search .......................................... 188/134;
 192/7, 8

[56] References Cited
UNITED STATES PATENTS
3,034,619  5/1962  Glasgow et al ................  192/7
3,285,377  11/1966  Rasmussen ....................  188/134X Primary Examiner—George E.A. Halvosa
Attorney—Marechal, Biebel, French and Bugg ABSTRACT: A torque limiting device for preventing transmission of a torque greater than a preset amount so that damage to the associated system cannot occur because of excessive torque. The device operates by transferring the torque between two annular members having a plurality of detent balls interposed therebetween to ride in precisely shaped radial grooves or ramps to effect relative axial and angular movement between the two annular members when the preset torque is reached. This action moves brake shoes into engagement with the housing to lock both the input and output shafts against further rotation until the excess torque is removed. The device is designed for instantaneous operation free from any drag on the system in which it is associated.

Patented Nov. 24, 1970
3,542,162
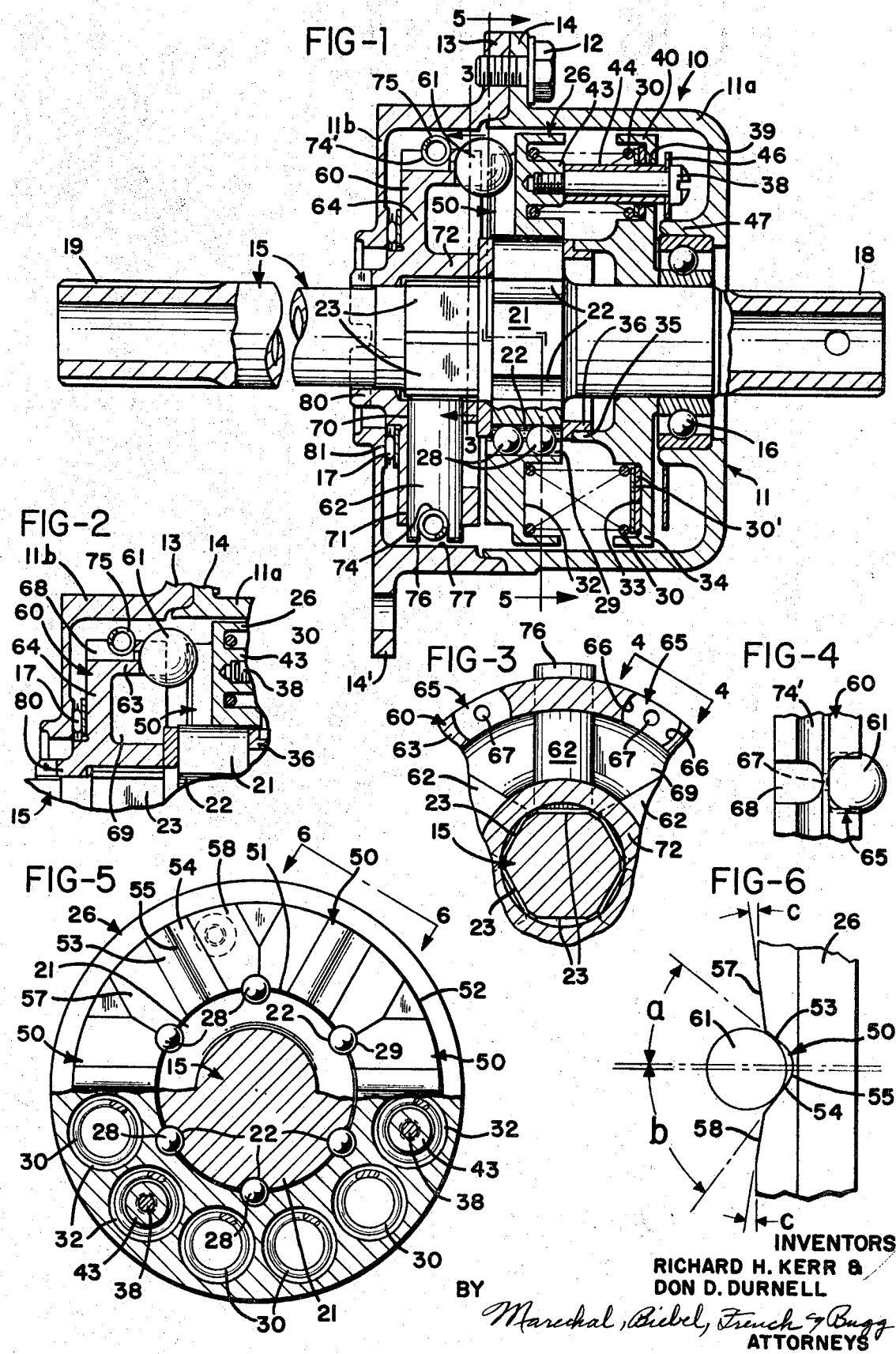
INVENTORS
RICHARD H. KERR &
DON D. DURNELL
BY Marechal, Biebel, French & Bugg
ATTORNEYS

TORQUE LIMITING DEVICE

BACKGROUND OF THE INVENTION

Frequently, it is necessary to use torque limiting devices in association with other machinery or equipment to prohibit the transfer of torques above a certain preset value so that damage to the associated machinery does not occur. One such application is in association with the actuators for moving the flaps of aircraft wings. When the driving torque applied to the flap actuator exceeds a specified overload, it is mandatory that the drive mechanism be immediately locked out to prevent damage to the actuator or to the flap itself. Such a device must act in both directions, that is, it must be capable of locking when the wing flap is being extended or retracted, although the preset lockout and torque maximum transmission may be different for each direction.

One form of a wing flap actuator and torque lockout system is shown in the patent of Glasgow and Kerr 3,034,619 of 1962, assigned to the same assignee as this application. In that patent, the torque limiter employs radially movable detents which seat in spherical sockets. While that structure was generally satisfactory where only a few such power takeoff elements are employed, or where it is not necessary precisely to define with high accuracy the point at which lockout will occur, it did not have consistent and repeatable lockout characteristics for use in systems where a single drive is employed to operate a large number of individual power take-offs or drives, or where the input power available to any one of the individual driven parts far exceeds the structural or design limits of such driven parts, or where precise torque responsive lockout is desired in the event of malfunction in one of the individual drives or associated components.

SUMMARY OF THE INVENTION

This invention relates to a torque limiting device wherein input and output shafts are locked against further rotation when the torque being transferred exceeds a preset maximum torque. The device is actuated almost instantaneously in both time and in angular rotation and offers little or no drag to the system during normal operation thereof.

These advantages result at least in part from the use of an axial movable member having formed thereon or carried thereon precision detent surfaces which take the form of detent balls interposed between a retainer and movable members. One member has grooves or ramps therein while the other is axially movable and has cooperating detent-forming balls which engage the ramps during normal operation. When the preset torque is exceeded, the balls are cammed outwardly of the ramps permitting the ball retainer member to move angularly under the influence of the driving torque with respect to the drive shaft to force brake shoes in the ball carrier member against the housing and thus lock the input and output shafts against further movement until the torque reduced to a point is below the preset amount. A ball spline is provided between the movable member and the input shaft for frictionless movement therebetween.

The torque limiting device for the present invention employs mutually axially engaging cams and cam surfaces which provide close control of these surfaces both as to finish and geometry. As noted, the cam preferably takes the form of a bearing ball which provides a spherical surface having a closely defined dimension. The axial actuation permits a larger number of springs to be used for controlling the engagement of the cooperating ball and cam surfaces, and permits the springs to be positioned axially and of a longer length than when positioned radially, and thus provides for more accurate control of the engaging forces. The cooperating cams and ramps, being annularly formed and adjacent the periphery of the housing, provide for a corresponding increase in the effective diameters of these parts and permit greater accuracy in the control of the point at which cam-out and torque lockout occurs. The design of the present invention permits the use of both rollers, balls, or integral cam surfaces, as may be desired.

BRIEF DESCRIPTION OF THE DRAWINGS

FIG. 1 is a sectional view through the torque limiting device in accordance with the invention;

FIG. 2 is a fragmentary view of the device showing the moved position of some of the parts of the actuation;

FIG. 3 is a fragmentary sectional view taken along the line 3-3 of FIG. 1 and showing the ball carrier member with the balls removed;

FIG. 4 is a fragmentary view taken along the line 4-4 of FIG. 3 and showing one ball in position;

FIG. 5 is another sectional view taken along the line 5-5 of FIG. 1; and

FIG. 6 is an enlarged fragmentary view looking as indicated by the line 6-6 of FIG. 5.

!DETAILED DESCRIPTION OF THE PREFERRED EMBODIMENT

Referring to FIG. 1, the torque limiting device 10 includes the housing 11 constructed from a pair of cup-shaped housing members 11a and 11b secured together by a plurality of conventional fasteners 12 which extend through the radially outwardly extending flanges 13 and 14 formed integrally on the housing member 11a and 11b. The housing member 11b may be formed with one or more lugs 14 by which the housing 11 may be anchored against rotating to some second torque receiving support.

The torque limiting device further includes an input shaft 15 which extends entirely through the housing 11 supported between the ball bearing 16 at the right hand housing member 11a and thrust bearing 17 on the inside wall of left hand member 11b. The shaft has splines 18 and 19 on the right and left hand ends thereof to facilitate connection to the associated mechanical system which is being protected from excess torque thereby. In the preferred embodiment of this invention such as employed in a wing flap actuating system, the through shaft 15 provides the means for transmitting rotational torque to one or more additional devices 10. In addition, this shaft is provided with an enlarged diameter central portion 21 having a plurality of spline grooves 22 extending axially through the outer surface thereof. Adjacent the enlarged portion 21 in the shaft 15 are a plurality of flattened cam surfaces 23 which operate a brake mechanism, as will be further described.

The mechanism for sensing the torque being transmitted through the device 10 includes annular cam or ramp member 26 secured to the central portion 21 of the shaft 15 for axial movement on a plurality of sets of spline balls 28 which are disposed in the semicircular grooves 22 in the central portion 21 and the complementary grooves 29 in the axial inner surface of the ramp member 26, as shown in FIG. 5. The diameter of the balls 28 is equal to or slightly less than the diameter of the grooves 22 and 29 so that the annular ramp member 26 moves freely in an axial direction on the shaft 15 without any substantial looseness.

The ramp member 26 is urged toward the left, as viewed in FIG. 1, by a plurality of coil springs 30 arranged circumferentially around the shaft 15. Each of the springs 30 extends in an axial direction between the circular recess 32 in the right hand side of the ramp member 26 and a similar recess 33 in the spring retainer 34 which is also annular in configuration and surrounds the shaft 15, as shown in FIG. 1. One or more shims 30' may be received in the recess 33 for adjustment of the force of the springs 30. This spring retainer is mounted immediately adjacent the ball bearing 16 and is supported for rotation with the shaft 15 between the shaft portion 21 and the bearing 16, an axial extending shoulder 35 supports a ring 36 at the central shaft portion 21 which forms one retainer for the spline balls 28.

To maintain angular alinement between the ramp member 26 and the spring retainer 34 the screws 38 extend through the bores 39 in the flange portion 40 of the retainer 34 and have their threaded ends received in a threaded boss 43 in the indentations 32 of the ramp member 26. A guide sleeve 44 is provided around the central portion of end screw 38 to hold the ring 46 adjacent the head of the screws 38. This ring is spaced from the housing flange 47 which supports the ball bearing 16, as shown in FIG. 1.

A plurality of radially extending grooves or ramps 50 are precisely machined in the left hand surface of the ramp member 26. These ramps extend radially from the inner surface 51 of the member 26 outwardly to the outer periphery 52, as shown in FIG. 5, and include the flat ramp surfaces 53 and 54 which may extend at different angles $a$ and $b$ from a line (FIG. 6) through the center of the ramp 50. The bottom of each ramp 50 has a smoothly rounded surface 55 connecting the ramp surfaces 53 and 54, and the gently sloped outer surfaces 57 and 58 are provided adjacent each of the side surfaces 53 and 54 at a slight angle $c$ to the plane of the outside surface of the ramp member 26 for the purposes to be described.

The mechanism for sensing the torque further includes an annular retainer and output member 60 mounted in the housing 11 on the shaft 15 adjacent the ramp member 26 for retaining a series of steel detent balls 61 and an arcuately interfitting series of brake shoes 62. Accordingly, the axially extending flange 63 is provided on the outer periphery of the retainer 60 extending from the web portion 64 thereof to the right, as viewed in FIG. 1. A plurality of cutouts 65 (FIG. 3) are provided, and this flange adapted to receive and retain the individual detent balls 61 in precise angular alinement with the ramps 50 provided in the ramp member 26. These cutouts have a U-shaped configuration as illustrated in FIG. 4, and the side walls 66 thereof are cylindrical (FIG. 3) to conform to the outer surfaces of the detent balls 61 which engage only in the area adjacent the upper end of the cutouts 65 and adjacent the openings 67 at the bottom of the cutouts. The recesses 68 and the larger annular groove 69 in the flange 63 are provided to reduce the amount of metal required in the retainer 60 to thus reduce the overall weight and inertia of the device 10 and improve its response time.

Circular guide slots 70 and 71 are provided on the inner radial flange 72 of the retainer 60 and in the outer radial flange 63 thereof, as shown in FIG. 1, to accommodate corresponding circular brake shoes 62 which extend radially through the inner slots 70 and into contact with the flat surfaces 23 on the shaft 15. The brake shoes 62 are positioned on the member arcuately between the detent balls 61. The outer end of these brake shoes 62 has a U-shaped cutout 74 therein adapted to receive the annular coil or garter spring 75 to hold them in place and urge them radially inwardly against the surfaces 23 on the shaft 15. The outer ends 76 of the shoes 62 are closely spaced from, and adapted to engage the cylindrical inner wall 77 of the housing member 11b, to lock the retainer 60 and thus the entire device 10 against further rotation as will be further described. Normally the outer ends of these brake shoes 62 ride very close to the inner surface 77 of the housing so that only slight movement is required to engage the braking action.

The flat surfaces 23 on the shaft 15 are angularly related to the position of the shoes 62 such that the inner surface of the shoes rests thereagainst when the device is in its normal operating position. Moreover, a separate cam surface 23 is provided on the shaft 15 for each of the brake shoes 62 and acts as a fast acting toggle cam to energize the shoes 62 with only slight relative angular movements of the surfaces 23 with respect to the shoes. In the particular embodiments shown in the drawings, six of the shoes are provided, although it is within the scope of the invention to use a smaller or a greater number.

The short tubular output shaft 80 is formed as an integral part of the retainer 60 and is mounted coaxially with the left hand end of the input shaft 15, as shown in FIG. 1. The thrust bearings 17 are provided adjacent the output shaft between the retainer 60 and the bearing surface 81 on the housing 11 so that the retainer 60 and output shaft 80 rotate freely despite the axial forces created within the housing.

In operation of the invention, the device is first properly installed in a mechanical system wherein the amount of torque being transferred through the input shaft 15 to the output shaft 80 must not exceeds preset maximum. This amount is determined by the various design features of the torque limiting device 10 and particularly the number and biasing effect of each of coil springs 33 and the slopes of the ramp surfaces 53 and 54 in relation to the diameter and contact points of the balls 61. When rotary movement is applied to the input shaft 15, it is transferred through the spline 28 to the ramp member 26, the detent balls 61 which are seated in the ramps 50 by the biasing effect of the springs 30, and the retainer 60 which is integrally connected to the output shaft 80. The garter spring 75 retains the brake shoes 62 in their inward position against the flat surfaces 23 on the shaft 15 so that they rotate close to but spaced from the inner surface 77 of the housing 11 so that the entire mechanism within the housing 11 rotates as an unit and acts as a unitary through shaft.

When the torque being transmitted to the output shaft 80 exceeds the preset maximum, the springs 30 can no longer hold the balls 61 in the ramps 50 thus causing the balls to ride up one of the ramp surfaces 53 or 54, depending on the direction of rotation. As this occurs, the balls force the ramp member to the right, as viewed in FIG. 1, against the bias of the coil springs 30. This movement is relatively frictionless due to the spline balls 28 between the ramp member 26 and the input shaft 15. As the balls 61 ride up the ramp surfaces 53 or 54, they permit a change in the relative angular position of the ramp member 26 and the retainer 60 since the balls are moving the ramp surfaces 53 or 54.

The retainer 60 now lags a slight amount with respect to the fixed and predetermined angular position of the ramp member 26 on the shaft 15, causing the flat surfaces 23 by toggle action to force the inner ends of the brake shoes 62 radially outwardly against the bias of the garter spring 75. The outer ends 76 of these brake shoes thus engage the housing surface 77 and lock the brake shoes thereto to prohibit further movement of the input shaft 15. The brake shoes 62 of this invention, during engagement thereof, now constitute a direct mechanical coupling between the input shaft 15 and the housing 11. These shoes absorb all of the inertial loads which are applied by the input shaft 15. They also absorb all the inertial loads connected to the output shaft 80 since they extend through and are guided by openings in the member 60. Further, under some conditions of loading, there may be an overrunning force applied at the shaft 80, such surfaces are subjected to considerable air loading. Again, this force is directly transmitted by the shoes 62 to the casing 11 leaving the remaining internal parts of the device including the precisely defined ball and ramp arrangement and the ball spline 28 unaffected by such torque.

The locking action is further facilitated as the balls 61 pass from the steep ramp surfaces 53 or 54 to the flatter ramp surfaces 57 or 58 causing them to increase quickly the amount of relative angular movement of the retainer 60 so that the cam surfaces 25 are moved quickly to exert sufficient force to the bottom surfaces of the brake shoes 62 to effect a complete locking of the device 10. The balls 61 will normally only travel a portion of the surfaces 57 or 58 so that the construction of the ramp surfaces 57 or 58 normally does not limit the amount of relative rotation of the retainer 60 and thus the amount of force applied by the cam surfaces 25 to the brake shoes 62. This action immediately locks the device and further rotation of either of the shafts is prohibited.

As mentioned above a typical use of the device 10 is as a part of a wing flap actuator in either the trailing or leading edge flaps in large transport aircraft. A typical such aircraft may use, for example, 12 flap actuators for the trailing flaps in each wing, and a single hydraulic drive motor is provided for operating all of the flap actuators in unison on both wings of the aircraft. Therefore, a drive motor is provided which has a torque output which far exceeds that of any of the individual flap actuators. The torque lockout device of the present invention may thus be used first to provide a through shaft by which the power from the drive source may be transmitted by suitable connections at the splines 18 and 19, and second, a flap mechanism drive device by a suitable output connection to the concentric output shaft 80. The housing 11 will be suitably anchored such as by the lugs 11, to aircraft frame structure.

Although the preferred embodiment of this invention has been described in connection with a branched drive system in which torque is taken through the device 10, it is within the scope of this invention to use the device in a single torque path, in which case there is no need for the output spline 19 of the shaft 15. In this case, it may be desirable to terminate the shaft 15 inwardly of the end of the output shaft 80, at the pilot shoulder 85 of the member 60, and the output shaft 80 made solid rather than hollow at all portions which are axially spaced from the end of the shaft 15.

The torque limiting device of the present invention is light in weight and is characterized by an ability accurately to sense a drive torque to the output shaft 80 which exceeds a predetermined maximum, thus causing axial separation of the members 26 and 60 by sliding movement of the member 26 on the ball splines 28 to a moved position as shown in FIG. 2. The load on the shaft 80 will then cause the balls 61 to move rapidly along their receptive ramp surfaces 57 or 58, depending upon the direction of rotation, effecting a rapid locknut of the torque at the input shaft 15 by the engagement of the shoes 62 with the inside surface 77 of the housing portion 11b.

It is inevitable, during lockout, that a small amount of torque will continue to be applied to the shaft 80, but due to the rapid response time of the device of the present invention this excess torque is maintained at a minimum and is well within the design limitations of the flap actuating structure connected to the shaft 80. For example, the system is one in which torque lockout with a drive shaft operating at 1,000 r.p.m. or more, occurs in a matter of a millisecond or less in a few degrees of shaft revolution, to protect the actuating structure being driven.

An important advantage of the present device is that it is automatically responsive to the removal and to the reversal of the drive torque for automatically resetting itself and reestablishing drive communication between the input and output shaft. Thus, if in any given situation, a momentary overload causes torque lockout, upon the elimination of this overload, the springs 32 are effective to force the ramp member 26 into its central position, and the garter spring 75 returns the brake shoes into place. The same occurs immediately upon the reversal of the direction of rotation of the shaft 15. Thus, there is no need in the present device for manual resetting in the event of torque lockout. This is particularly important when the device is used in conjunction with the movement of an aircraft control surface since it permits resetting by the pilot in the air, and lockout in one direction due to either a temporary or a permanent obstruction does not prevent normal operation in the other direction.

While the form of apparatus herein described constitutes a preferred embodiment of the invention, it is to be understood that the invention is not limited to this precise form of apparatus, and that changes may be made therein without departing from the scope of the invention.

We claim:

1. A torque limiting drive device adapted to be operated in either of two directions of rotation for driving a torque responsive element and for locking out all drive torque which is in excess of a predetermined maximum drive torque and for automatically resetting upon the removal of drive torque, comprising a housing, an input shaft journaled in said housing, an annular cam member mounted in surrounding relation to said shaft and having means in one radial face thereof defining a plurality of angularly spaced trough-like recesses, low friction spline means connecting said cam member to said input shaft and providing for axial movement of said cam member on said input shaft without substantial friction therebetween, an output member in driving relation to said driving element, said output member being mounted on said shaft axially adjacent said cam member and having means supporting a plurality of angularly spaced balls corresponding in spacing and in number to said recesses, spring bias means urging said cam member axially on said spline means toward said output member with said balls normally seated in said recesses, means in said housing defining an annular brake surface, means in said output member defining a plurality of friction members movable generally radially with respect to said output member, an annular series of cam surfaces formed on said input shaft, said friction members having inner ends normally seated on said surfaces and having outer surfaces in close running clearance with said housing brake surface so that relative angular movement between said output member and said input shaft results in said cam surfaces driving said friction members radially outwardly into frictional engagement with said housing surface for locking said output member with respect to said housing, and said balls and recesses creating a separating force under the influence of excess driving torque in either direction of rotation urging said cam member axially and providing for said relative angular movement.

2. The device of claim 1 in which said recesses are each defined with a first ramp surface on one side thereof the angle of which defines the torque necessary to cause said balls to move out of said recesses in one direction of rotation, and are each further defined by a second ramp surface on the opposite side thereof which defines the torque necessary to move said balls out of said recesses in the opposite direction of rotation.

3. A torque limiting drive device adapted to be operated in either of two directions of rotation for driving a torque responsive element and for locking out all drive torque which is in excess of predetermined maximum drive torque and which is in excess of predetermined maximum drive torque and for automatically resetting upon the removal of drive torque, comprising a housing, an input shaft journaled in said housing, an annular cam member mounted on said shaft and having means in one radial face thereof defining a plurality of angularly spaced recesses, a ball spline connecting said cam member to said input shaft and providing for axial movement of said cam member on said input shaft without substantial friction therebetween, an output member in driving relation to said driven element and positioned axially adjacent said cam member and having means defining a plurality of angularly generally spherical surfaces corresponding in spacing and in number to said recesses, bias means urging said cam member axially toward said output member with said spherical surfaces being normally seated in said recesses, means in said housing defining a brake surface, means in said output member defining a plurality of brake shoes movable with respect to said output member, a series of brake actuating toggle surfaces formed on said input shaft with said shoes having ends normally seated on said toggle surfaces, said shoes having friction surfaces in close running clearance with said housing brake surface so that relative angular movement between said output member and said input shaft results in said toggle surfaces driving said shoes into frictional engagement with said housing surface for temporarily locking said output member and said input shaft with respect to said housing, and said spherical surfaces and recesses creating a separating force under the influence of excess driving torque urging said cam member axially providing for said relative angular movement upon the occurrence of such excess torque in either of said driving directions.

4. A torque limiting device as defined in claim 3 wherein said recesses define a plurality of radially extending grooves in said cam member, and said spherical surfaces each consist of a ball supported by said output member.

5. The device of claim 3 in which said recesses are each defined with a first ramp surface on one side thereof the angle of which defines the torque necessary to cause said spherical surfaces to move out of said recesses in one direction of rotation and are each further defined by a second ramp surface on the opposite side thereof which defines the torque necessary to move said spherical surfaces out of said recesses in the opposite direction of rotation.

6. The device of claim 5 in which each said recess is further defined by a pair of outer gently sloping ramp surfaces formed at an angle less than those of said first and second surfaces to accelerate the movements of said spherical surfaces relative to said cam member upon the occurrence of such an excess torque.